(12) United States Patent
Erlingsson et al.

(10) Patent No.: US 8,522,034 B2
(45) Date of Patent: *Aug. 27, 2013

(54) SYSTEMS AND METHODS FOR TRANSPARENT CONFIGURATION AUTHENTICATION OF NETWORKED DEVICES

(75) Inventors: Úlfar Erlingsson, San Francisco, CA (US); Xavier Boyen, Palo Alto, CA (US); Darrell Anderson, Durham, NC (US); Wayne Gray, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/213,943

(22) Filed: Aug. 19, 2011

(65) Prior Publication Data

US 2012/0036367 A1 Feb. 9, 2012

Related U.S. Application Data

(63) Continuation of application No. 10/627,270, filed on Jul. 25, 2003, now Pat. No. 8,090,951.

(60) Provisional application No. 60/398,564, filed on Jul. 26, 2002.

(51) Int. Cl.
*H04L 9/32* (2006.01)

(52) U.S. Cl.
USPC ........... 713/176; 713/151; 713/160; 713/161; 726/14

(58) Field of Classification Search
USPC .................... 713/151, 160, 161, 176; 726/14
See application file for complete search history.

(56) References Cited

U.S. PATENT DOCUMENTS

| | | | | |
|---|---|---|---|---|
| 5,151,899 A | * | 9/1992 | Thomas et al. | 370/394 |
| 6,282,650 B1 | | 8/2001 | Davis | |
| 6,330,672 B1 | * | 12/2001 | Shur | 713/176 |
| 6,647,424 B1 | | 11/2003 | Pearson et al. | |
| 7,587,601 B2 | * | 9/2009 | Levy et al. | 713/176 |
| 2002/0059522 A1 | | 5/2002 | Hirano et al. | |
| 2003/0200439 A1 | * | 10/2003 | Moskowitz | 713/176 |

FOREIGN PATENT DOCUMENTS

DE 199 26 683 A1 12/2000

* cited by examiner

*Primary Examiner* — Harunur Rashid
*Assistant Examiner* — Gary Lavelle
(74) *Attorney, Agent, or Firm* — Sterne, Kessler, Goldstein & Fox P.L.L.C.

(57) ABSTRACT

Methods and systems are disclosed for providing secure transmissions across a network comprising a transmitting device and a receiving device. At the transmitting device, a stream of watermark bits is generated. Next, a plurality of watermarks is generated, each of the plurality of watermarks comprising an index number and a portion of the stream of watermark bits. The watermarks are inserted into each header of a plurality of outgoing packets. At the receiving device, the plurality of outgoing packets are received and it is determined if a received packet is valid based on the watermark in the header of the received packet. The stream of watermark bits may be generated using a stream cipher such as RC4, a block cipher such as 3DES in CBC mode, or other equivalent pseudo-random stream generating techniques.

20 Claims, 6 Drawing Sheets

SYSTEMS AND METHODS FOR TRANSPARENT CONFIGURATION AUTHENTICATION OF NETWORKED DEVICES

CROSS-REFERENCE TO RELATED APPLICATION(S)

This application is a continuation of U.S. application Ser. No. 10/627,270, filed Jul. 25, 2003, which claims priority to U.S. Provisional Application No. 60/398,564, entitled "SYSTEM AND METHODS FOR TRANSPARENT CONFIGURATION AUTHENTICATION OF NETWORKED DEVICES," filed Jul. 26, 2002, both of which are expressly incorporated herein by reference in their entireties.

FIELD OF THE INVENTION

This invention relates generally to methods and systems for providing secure transactions across a network and, more particularly, to methods and systems for watermarking at the packet level.

BACKGROUND OF THE INVENTION

The ubiquity of networked computing environments, and the ever increasing reliance thereupon, has created a demand for network security products that guard against attacks from outside the network, such as computer worms or viruses, distributed denial of service attacks, and targeted criminal computer trespassing. Often ignored when discussing network security, but just as dangerous and disruptive, are attacks from inside the network. The proliferation of powerful portable networked computers, such as laptops, handheld devices, and personal digital assistants (PDAs), makes it particularly easy for an insider to connect a personal machine to a restricted network and unknowingly spread malicious programs, thereby compromising the integrity of the network.

Traditional approaches to ensuring the security and integrity of computer networks of any size include, for example, user authentication mechanisms, Internet firewalls and gateways, intrusion detection and reporting systems, installation, update, and configuration deployment systems, and distributed computer management systems. User authentication mechanisms provide security by allowing only authorized users to log on to the network devices for which they have been approved. Among other things, these mechanisms may be useful for preventing persons foreign to the organization ("foreign persons") from inadvertently or maliciously compromising the network integrity from within, by means of, e.g., introducing malicious "Trojan horse" software, or tampering with the authorized installed software base. Internet firewalls and gateways filter out potentially unsafe content originating from untrusted sources at the point of entry into a network environment. Intrusion detection and reporting systems, including "anti-virus" software, aim at limiting the extent of the damage after a breach of integrity has occurred, by means of early detection and hopeful containment of the breach.

Installation, update, and configuration deployment systems, when used in conjunction with the above mechanisms, ensure that the security software is up-to-date in order to respond against the most recent attacks as they are discovered. Distributed computer management systems ensure that all devices on a network have an approved configuration and only run approved applications.

All of the security mechanisms described above operate on the premise that if a networked environment is defended from outside threats, the entire environment will remain safe. These security mechanisms, however, are useless against internal threats such as the following. Say, for example, an authorized user inadvertently introduces a computer virus on an authorized machine by opening an infected piece of email from a business partner. In this case, the virus takes control of the machine and proceeds to replicate over the entire network. Another such internal threat is, for example, an authorized user that takes home an authorized laptop computer and connects it back to the internal network the following day. In the meantime, the laptop became infected with a virus, which has spread to the network from the inside. Yet another example of an internal threat is an authorized user that brings his or her own personal laptop or handheld computer and configures it to interoperate with the corporate network. Most networks do not authenticate the machines that are connected to them, or do so in such a way that the security credentials can easily be replicated across machines, thereby allowing the network to become infected. A further example of an internal threat is a hacker that exploits the poor security of existing wireless network offerings to gain access to a nearby corporate wireless network. Even though the trespasser is probably unable to log on to the network, lacking a valid password, the integrity of the network may still be potentially compromised by his or her activities.

These examples illustrate the necessity of some form of protection against internal threats, whether the threats result from inadvertence or malice.

SUMMARY OF THE INVENTION

According to at least one aspect of the invention, methods and systems are disclosed for providing secure transmissions across a network comprising a transmitting device and a receiving device. At the transmitting device, a stream of watermark bits is generated. Next, a plurality of watermarks is generated, each of the plurality of watermarks comprising an index number and a portion of the stream of watermark bits. The watermarks are inserted into the headers of a plurality of outgoing packets. At the receiving device, the plurality of outgoing packets are received and it is determined if a received packet is valid based on the watermark in the header of the received packet.

BRIEF DESCRIPTION OF THE DRAWINGS

The accompanying drawings, which are incorporated in and constitute a part of the specification, illustrate exemplary implementations and embodiments of the invention and, together with the detailed description, serve to explain the principles of the invention. In the drawings.

DETAILED DESCRIPTION

Reference will now be made in detail to exemplary implementations and embodiments of the invention, examples of which are illustrated in the accompanying the drawings. Wherever possible, the same reference numbers will be used throughout the drawings to refer to the same or like parts.

Introduction

The present invention provides methods and systems for addressing the threats posed to a computer network environment that may be created by the connection of potentially unsafe devices to, and from within, the network environment. It is well known that conventional networks may comprise "servers" and "clients." Generally speaking, "servers" are the devices in a network that provide data and "clients" are other machines in the network that request data. In most cases, servers are protected against direct user tampering, but may be subject to internal attacks coming from the various clients that connect to the network. Systems and methods consistent with the present invention protect servers against such internal network attacks.

The present invention is described herein in terms of "client" aspects and "server" aspects. However, those skilled in the art will understand that, in some cases, the same machine in a network may act as both a client and a server. The same machine may, for example, work as a client in one transaction, but then operate as a server in a different transaction. This may occur, for example, when machines are interconnected as peers in a work group. In such cases, both the client and the server aspects of the invention described therein may be practiced on the same machine.

The principles of the present invention may be described generally as follows. First, a client is determined to be "clean," that is, not containing a virus, Trojan horse, malicious software, or is otherwise secure. Once determined to be clean, the clean machine is associated with a secret token that acts as a cryptographic seal of authenticity. The secret token may take the form of, for example, a cryptographic key, a secret token, or a digital certificate. The determination that a client is clean may occur upon initial setup of a client by an authorized administrator or during operation by, for example, an automatic or manual process that inspects and validates the machine state or configuration.

The newly configured machine may also be equipped with a configuration monitoring system, which can monitor and mediate system activity. The configuration monitoring system may be integrated at the highest privilege level within the operating system and may ascertain that no unauthorized change has been effected or unauthorized application installed. The configuration monitoring system may act in accordance with a security policy in force in the network. If an anomaly or unauthorized action is detected, the integrity of the machine configuration or of the security mechanism itself may become untrustworthy, so the configuration monitoring system may destroy the secret token for this particular machine.

A communications monitoring system may be used, on the client machine, to intercept outgoing information packets. As long as the secret token is present, the communications monitor may use it to cryptographically watermark outgoing packets. In certain embodiments of the present invention, the watermarking is transparent to the underlying protocol, i.e., it does not affect the content of the packets, and does not interfere with the proper working of the communication protocols in case the receiving end is not equipped to recognize the watermarks.

On the server side, a similar communications monitor may be set to intercept and filter incoming packets as close as possible to the point of entry. Thereafter, the communications monitor only relays to other functions, such as higher-level services or applications, those packets that bear a valid and current watermark. The non-watermarked packets may be simply discarded.

In at least one embodiment, a system consistent with the present invention may comprise a client side and a server side. In certain embodiments, the client side and the server side may be present in the same machine if, for example, the machine is to operate as both a trusted client and a server on the protected network.

Client-Side System

Figure 1:
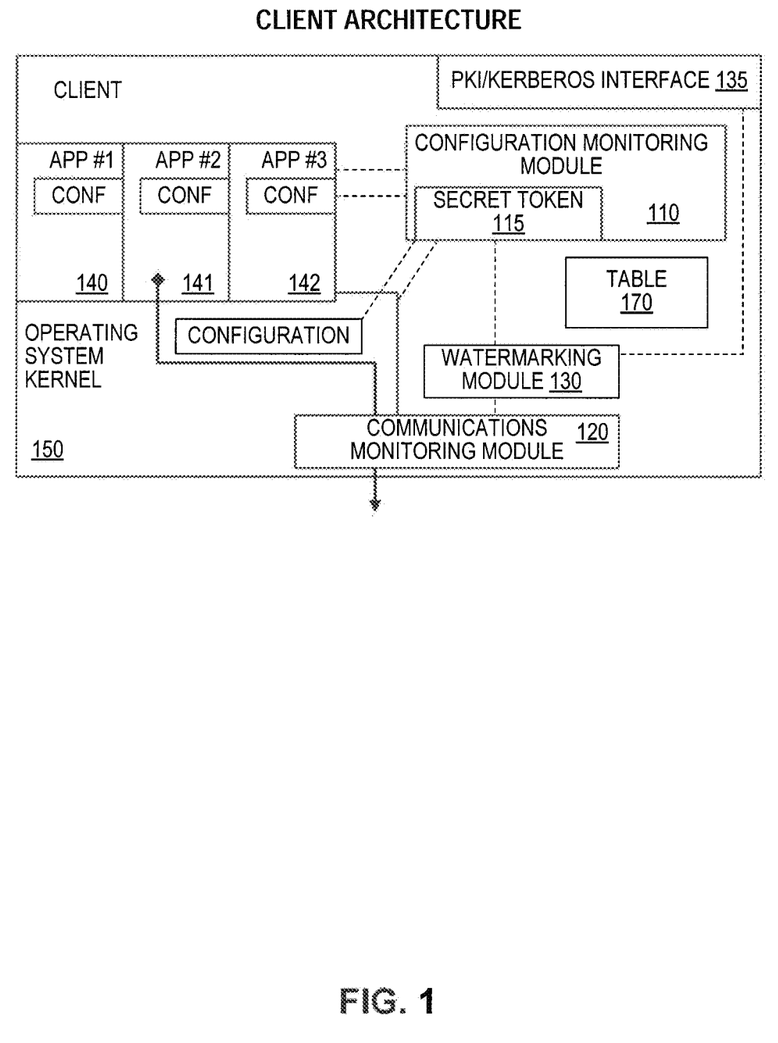
FIG. 1 is a high level block diagram of an exemplary client-side system for practicing systems and methods consistent with the present invention.

FIG. 1 is a high level block diagram of an exemplary client-side system for practicing systems and methods consistent with the present invention. As shown in FIG. 1, in exemplary embodiments, a client comprises a configuration monitoring module 110, a communications monitoring module 120, and a watermarking module 130. Session table 170 stores active sessions and can be queried by other modules to determine if a particular session is active.

Configuration monitoring module 110 may monitor the configuration of any number of applications 140, 141, 142, ... 14n and of operating system kernel 150 running on the client. Such monitoring may be, for example, constant, periodic, or may be triggered by events, such as a request to use secret token 115 by watermarking module 130, or other events that may result in a configuration change. Examples of events that may cause potentially threatening configuration changes include, without being limited to:

Anti-virus definition database becoming too old;
Key system components being tampered with;
Modification of key system or application binaries;
Security or configuration parameters being modified;
Modification of system configuration files or databases;
Device driver being installed or loaded into the kernel;
Non-sanctioned application being installed in the main environment (as opposed to within an isolated virtualized safety environment); and
Security software being uninstalled (such as GreenBorder Internet Security, which provides a transparently isolated virtual environment for untrusted applications).

Configuration monitoring module 110 also safeguards the secret token 115, by monitoring the configuration of applications 140, 141, 142, . . . 14n, and of operating system kernel 150, detecting changes to the configurations, and destroying secret token 115 or otherwise blocking its use, if a potentially threatening change to a configuration is detected. As mentioned above, the secret token may take the form of for example, a cryptographic key, a secret token, or a digital certificate.

Configuration monitoring module 110 may be implemented using a combination of techniques commonly known to those skilled in the art, and services provided by common host operating systems. For example, the Windows Cryptographic API provides support for storing secret data on the local machine in a keyless, yet obfuscated manner. In at least one exemplary embodiment, configuration monitoring module 110 may be launched during the start-up sequence, at which time it verifies the integrity of the current configuration (such as, by comparing it to a cryptographically-signed reference specification).

Figure 2:
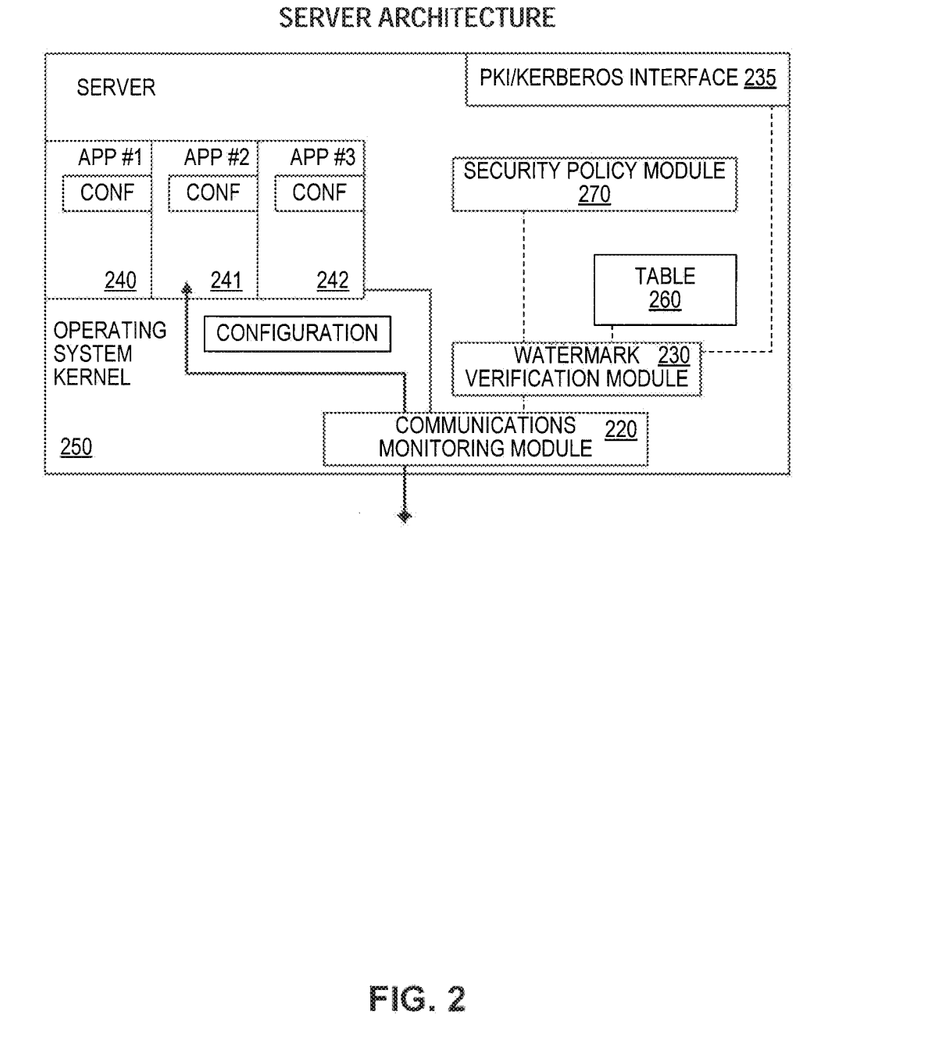
FIG. 2 is a high level block diagram of an exemplary server-side system for practicing systems and methods consistent with the present invention.

Communications monitoring module 120 intercepts outgoing packets (such as IP packets, for systems communicating via the Internet Protocol) and checks to see if a secure communications session is still available. If a secure communications session has been established with the server, communications monitoring module 120 sends the packets to watermarking module 130 for tagging with a cryptographic watermark. In certain embodiments of the present invention, this module (and its counterpart on the server side, communications monitoring module 220) may reside at the base of the communication stack within the operating system kernel and may depend on the specifics of the operating system or the networking protocol in use. For example, communications monitoring modules 120 and 220 may be low-level IP stack monitors in charge of intercepting the outgoing or incoming IP traffic. In at least one exemplary embodiment, communications monitoring modules 120 and 220 are inserted to reside within the IP stack of the host operating system in such a way as to be activated whenever an IP segment or packet is to be transmitted or received. Communications monitoring modules 120 and 220 may then initiate watermarking-related operations by making appropriate calls to the watermarking module 130 and/or watermark verification module 230. In certain embodiments, both modules may reside within the kernel in an actual implementation. One exemplary implementation of an interface between a low-level IP stack monitor and watermarking module 130 may be found in Appendix A.

In certain embodiments, communications monitoring modules 120 and 220 may be inserted into modern versions of the FreeBSD kernel, which is a variant of Unix. Communications monitoring modules 120 and 220 may then be compiled as a run-time loadable kernel module, which attaches to the kernel-supplied hooks into the IP stack, originally designed to accommodate external packet filters or firewalls. In certain operating systems, such as Microsoft Windows, the kernel source code may be unavailable. In such implementations, communications monitoring modules 120 and 220 may be loaded alongside an operating kernel, and inserted into the running kernel by redirecting internal IP-stack kernel system calls, in a manner familiar to those skilled in the art.

Configuration monitoring module 110 also provides secret token 115 to watermarking module 130 as needed. Watermarking module 130, for example, receives packets from communications module 120 and communicates with configuration monitoring module 110 to determine if secret token 115 is still available for use in watermarking packets. Watermarking module 130 may initiate, maintain, and, if necessary, restore, a shared secret authentication state with each server the client is communicating with. In certain embodiments, this module is independent of the operating system, although it may optionally communicate with a network-wide security infrastructure (such as a Kerberos interface or public-key infrastructure (PKI) 135) to obtain server-specific key material, such as during the initial authentication data sent upon first communicating with a new server.

Server-Side System

FIG. 2 is a high level block diagram of an exemplary server-side system for practicing systems and methods consistent with the present invention. In exemplary embodiments, the server-side system is composed of a communications monitoring module 220 and a watermark verification module 230. Optionally, the server-side system may also comprise a policy module 270.

Communications monitoring module 220 intercepts incoming network traffic, and filters it before providing it to the rest of the system and/or applications running on the server. In at least one embodiment, communications monitoring module 220 filters incoming traffic based on watermark validity. In certain embodiments, both module 220 and its namesake on the client side (module 120) may reside at a low level within the operating system of the server and client, respectively. The operation of these modules may also vary depending on the networking protocol in use.

Watermark verification module 230 may be called by communications monitoring module 220. Watermark verification module 230 verifies the validity of the watermarks associated with incoming packets, and determines whether the bearing packets should be allowed to proceed, or be dropped. In certain embodiments, this determination is optionally based on a security policy. This module may optionally interact with a network-wide security infrastructure, for example, to obtain client-specific key material used during the validation of the initial authentication data received from a client.

An optional security policy module 270 may be used to specify exceptions to the watermark-based filtering scheme in order, for example, to allow some or all incoming packets to be allowed to proceed, even without a valid watermark. For example, an-exemplary policy may state that all Dynamic Host Configuration Protocol (DHCP) requests and Domain Name System (DNS) queries should be allowed to proceed, even without a valid watermark. The DHCP is an Internet protocol for automating the configuration of computers that use TCP/IP and can be used to automatically assign IP addresses, deliver TCP/IP stack configuration parameters, and provide other configuration information. DNS is used to translate between domain names and IP addresses and control Internet email delivery and location of web sites.

Watermarking

Methods and systems consistent with the present invention construct watermarks that are compatible with network transport protocols, such as Internet Protocol, by creating a covert channel in the packet header that is non-disruptive to the standards of various transport protocols. Communications may begin with a special packet recognized only by compliant servers. Thereafter, subsequent packets in a session are transparently watermarked using available bytes in the header, albeit in such a way that links them in a sequence originating in the initial packet.

Figure 3:
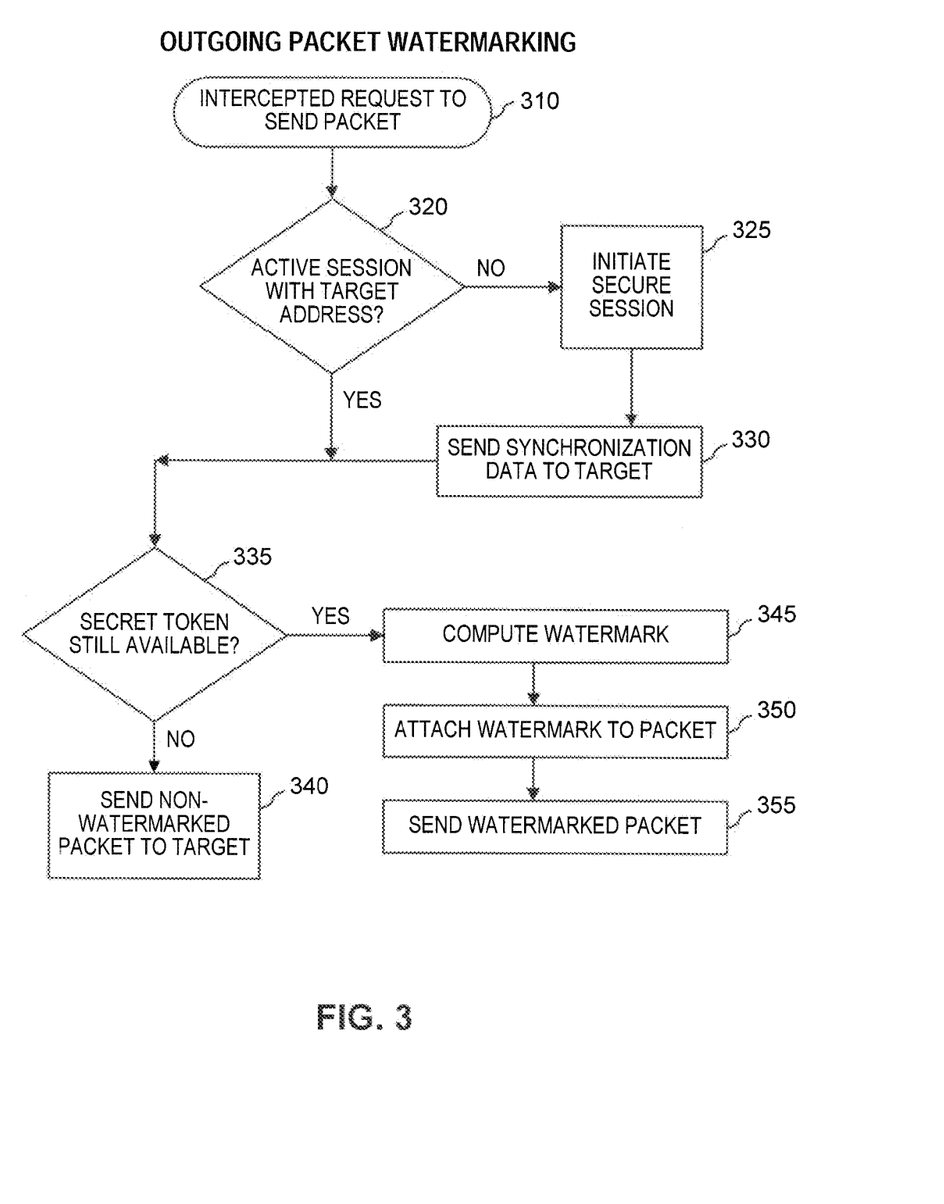
FIG. 3 shows one exemplary method for watermarking outgoing packets consistent with the present invention.

FIG. 3 shows one exemplary method for watermarking outgoing packets consistent with the present invention. To begin, a client prepares to transmit a packet to a server. The request to send a packet is intercepted (step 310). The packet may be intercepted, for example, by communications monitoring module 120 of FIG. 1. The communications monitoring module checks to see if the client already has established a secure communication session with the target server by, for example, checking the active sessions stored in table 170 (step 320). If the client has not yet established a secure communication session with the server, such as when starting communication with a server for the first time, the client initiates a secure communication session (step 325).

To initiate a secure communication session, the originating client sends a packet containing authentication/synchronization data to the server (step 330). The authentication/synchronization data may be based on the secret token of the client (assuming that it has not been discarded by the configuration verification subsystem). The authentication/synchronization data may be constructed based on single-pass symmetric or asymmetric encrypted key exchange techniques as known in the art. In some embodiments, construction of the authentication/synchronization data using a symmetric cipher or message authentication code (MAC), for example, may be preferred, such as in the case where all servers are restricted devices that may be entrusted with the knowledge of the secret tokens provided to the clients (e.g., centrally administered corporate servers out of reach of ordinary users). In certain embodiments, use of an asymmetric cipher or key exchange scheme may be preferred or even mandated depending on the application. Use of an asymmetric cipher may allow the authentication mechanism to work even though the servers are not entrusted with copies of the client tokens.

The authentication/synchronization data may be constructed based on some or all of the following elements: the client secret token; the server public key, if applicable; the client network address (and port, if applicable); the server network address (and port, if applicable); the current time; and a cryptographic salt. In general, the authentication/synchronization data proves to the server, in a cryptographically strong way, that the client still possesses its secret token (typically without revealing it), which is a means for indicating that data from the client is coming from a safe and approved configuration. This authentication/synchronization data may also be used to establish a cryptographically strong shared secret session state between the client and the server, which the subsequent packet watermarks can leverage.

Upon sending the initial synchronization packet, the client constructs the corresponding shared cipher state, and stores it for future use. This information may be stored, for example, in table 260 of FIG. 2, which may be lookup table, wherein the information is stored under the server designation (e.g., indexed by address and port). Upon receiving the initial synchronization packet, the server authenticates the information by, for example, verifying that the time stamp is current and the claimed source and destination addresses are correct (see, for example, step 425 of FIG. 4). The server may then use the received data to construct the shared stream cipher state, as will be discussed in more detail below. Table 260, therefore, indicates whether a particular session is an active session.

Once a shared cipher state has been achieved between the client and the server, communications from the client to the server may proceed. Before watermarking of packets may take place, methods consistent with the present invention determine whether the secret token is still available. As discussed herein, watermarking module 130 may query configuration monitoring module for the status of secret token 115. f configuration monitoring module 110 has detected a potentially threatening change to a configuration, signaling perhaps that the client is no longer "clean," configuration monitoring module 115 may have destroyed or rendered unavailable secret token 115. In this case, the packets may not be watermarked, but may be transmitted to the target server (step 340).

If, however, secret token 115 is still available (step 335), a watermark may be computed based on the secret token (step 345) and the watermark may be attached to one or more packets (step 350). Thereafter, the watermarked packets may be sent to the server (step 355).

Specifically, the initial special packet is used to set up a shared secret session key from the client to the server. The shared secret session key may then be used to generate a sequence of bits to be used as watermarks for the regular data packets in the session. The sequence used to watermark regular data packets may, for example, be a stream generated using a stream cipher such as RC4, a block cipher such as 3DES in CBC mode, or other equivalent pseudo-random stream generating techniques. The stream may be pseudo-random. Techniques for generating the stream may be implemented in software or hardware.

In at least one exemplary embodiment, on the client side, each outgoing packet to the designated server is transparently watermarked with cipher stream data by replacing a certain number of bits of header information with an equivalent number of bits from the generated stream. The amount of data added to each packet may vary according to underlying packet format. In the Internet Protocol, for example, two bytes or sixteen bits of watermark can be transparently inserted in each data packet using methods described herein. In one exemplary embodiment, the watermarks are generated sequentially from the initial state of the stream cipher (and thus differ from one packet to the next). Additionally, each watermark in a given sequence may be associated with an index number, starting at 0 (thus, in this example, 0 is the index of the synchronization packet, 1 is the index of the watermark attached with the first data packet, and so on). Hence, the client generates watermarks in increasing natural order of index number.

In certain embodiments, the value of the data used to watermark the packets does not depend on the data payload of the packet to which it is attached. In alternative embodiments, however, the watermark may be constructed to cryptographically depend on the packet content, thereby ensuring the integrity of such content.

Unlike alternative backward-incompatible technologies, such as SSL, the watermarking approach allows compliant servers to gain assurance of package integrity without breaking backward compatibility with non-compliant servers, thereby allowing clients to employ this technique without knowing whether the recipient is equipped with the technology to recognize the watermarks. In at least one such exemplary embodiment, the watermarks may be constructed using at least a portion of a MAC, instead of the actual cipher stream data, where the MAC is derived from the packet content data to protect, and is keyed by the cipher stream data it replaces, as those skilled in the art will appreciate.

In certain embodiments, payload-independent watermarks allow the underlying operating system to fully exploit the direct memory access (DMA) capabilities of the networking hardware, whereby the packet payload may be directly copied from main memory to the networking hardware buffer, without being seen by the CPU. Computing a MAC would otherwise force the CPU to access the payload.

Figure 4:
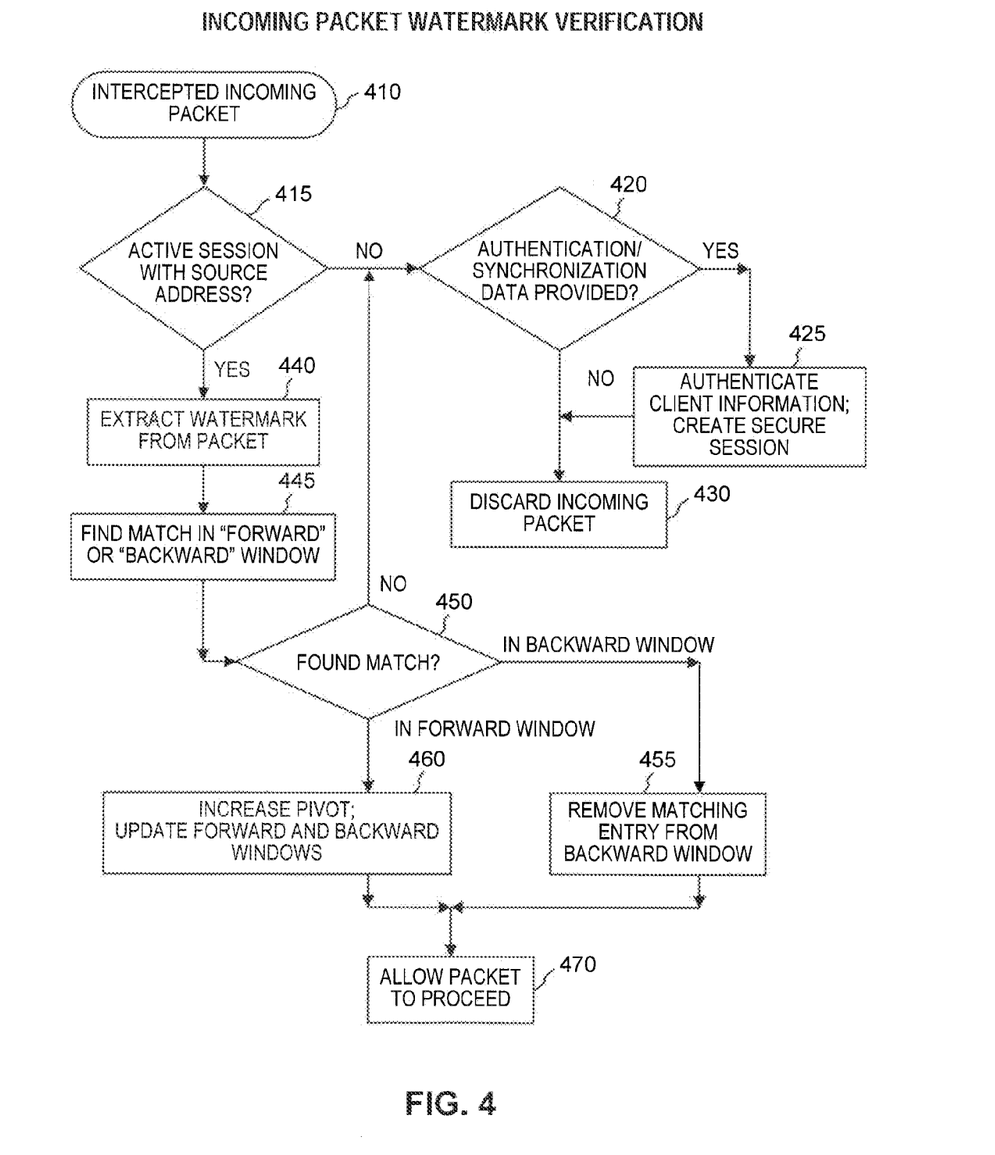
FIG. 4 shows one exemplary method for verifying incoming watermarked packets consistent with the present invention.

The present invention also provides methods and systems to reduce or eliminate the lost, duplicated, or reordered packets that often occur in most computer networks. FIG. 4 shows one exemplary method for verifying incoming watermarked packets consistent with the present invention. On the receiving end, incoming packets may be intercepted (step 410) such as by communications monitoring module 220 of FIG. 2. Communications monitoring module 220 may determine if the server has an active session with the client that sent the intercepted packet (step 415). If the server has no active session with the transmitting client, the server determines whether the incoming packet is authentication/synchronization data sent by the client to establish a session (step 420). If the intercepted packet is authentication/synchronization data, the server may authenticate the client information and establish a secure session (step 425). The server may authenticate the information by, for example, verifying that the time stamp is current and the claimed source and destination addresses are correct. The server may then use the received data to construct the shared stream cipher state, which it may then associate with the client's address and port. The server may also store the authentication/synchronization data for use in computing Authentication of each pair of communicating client and server uses a unique shared secret stream cipher state for the watermark generation and verification. To accommodate this, each client maintains a table of all current authenticated sessions indexed by server addresses (optionally including the ports) in table 170. Table 170 is periodically purged of any stale entry it may contain. "Stale" entries may be determined, for example, based on the time of last communication or other heuristics. If an active session is mistakenly purged, the client may be caused to re-synchronize with the server upon sending the next packet. The server similarly maintains a table of active sessions indexed by client network addresses (and, optionally, ports) in table 260.

If the intercepted packet is not authentication/synchronization data, or the client cannot be authenticated based on the authentication/synchronization data provided by the intercepted packet (step 425), the packet may simply be discarded as untrusted (step 430).

If, however, the server already has an active session with the client (step 415), the watermark may be extracted from the intercepted packet (step 440). The watermark may either be extracted by, for example, communications monitoring module 220 (and sent to watermark verification module 230) or directly by watermark verification module 230 if the entire packet is sent to watermark verification module 230 for processing.

After the watermark has been extracted, the watermark may be compared to "forward" and "backward" windows of expected watermarks maintained or generated by the server (step 445). As mentioned above, at the client, each watermark in a given sequence may be associated with an index number, such that watermarks are generated in an increasing natural order of the index numbers. In the present invention, the server may at all times maintain a record of or pointer to the index number of the highest numbered valid watermark it has received (from a particular client). This index number may also be called the "pivot." The server may also maintain or generate two small lists, or windows, associating watermarks with their index numbers. A forward window comprises the watermarks whose index numbers immediately follow the pivot. A backward window comprises watermarks whose index numbers immediately precede the pivot. The server may generate the expected watermarks in the forward and backward windows based on the authentication/synchronization received from the client.

Whenever the server receives a packet from a client, the watermark may be compared with the contents of both windows, so as to determine the index number of the match, if any (step 445). If a match is found in the forward window (step 450), the pivot may be increased accordingly, and the forward and backward windows may be adjusted based on the new pivot (step 460). For example, the forward window entries with index numbers between the old and the new value of the pivot may be displaced to the backward window, after which the forward window may be replenished with an appropriate number of new watermarks ahead of the current pivot, and the backward window may be trimmed of its oldest entries. If a match is found in the backward window (step 455), the matching entry may be removed from that window (the pivot and the forward window remain unchanged).

The watermark is accepted as valid (and therefore allowed to proceed) only if there was a match in either window (step 470). If no match was detected in step 450, the packet is discarded (step 430).

In at least one embodiment, to account for the possibility of severe transient network problems, an additional mechanism is provided, whereby, upon receiving an invalid watermark from a client, the server replies with a special re-authentication request (e.g., formatted as a UDP packet to an otherwise unused port, or using in any other method). Upon receiving such request, the client may choose to restart the entire unidirectional authentication process, in order to achieve a fresh shared state with the server.

Packet Watermarking Over IP

This section describes the systems aspects of transparently watermarking Internet Protocol packets, in a backward compatible fashion. Two orthogonal approaches are presented, which may be used independently or in tandem, to afford the greater watermarking capacity.

Data transmission over an IP network occurs in logical units, called segments, whose length is variable and is at the discretion of the sender. Depending on their length, segments may be broken down in multiple units called packets, or transmitted atomically as a single packet. Packets belonging to the same segment are reassembled at the receiving end, to reconstitute the original segment; in case of a transmission problem with one of the packets, the entire segment is discarded. In support of this mechanism, the IP protocol provides for a 16-bit segment ID field in the IP header, that is a random value attributed and attached upon creation of the segment, and that is preserved in all packets, which the segment is broken up into, during transit. IP packet headers also contain "offset" and "length" fields, which are used to indicate the relative position of the packet within the segment, as well as a "next" flag, which is used to indicate whether the bearer is the last packet of the segment, or not. In addition to the above, IP packet headers also contain two 32-bit source and destination address fields, as well as a rarely used 8-bit TOS field (originally meant to specify terms of service options).

One exemplary method of watermarking consistent with the present invention is direct watermarking using the segment ID field. This exemplary watermarking method exploits the segment ID mechanism by substituting a watermark for the segment ID field (the specific value of which is generated according to the methods described elsewhere in this document). If the segment must be divided into several packets, all packets inherit the same watermark from the modified segment ID field, in order to comply with the requirements of the IP protocol.

On the client side, outgoing IP packets are intercepted after the segment header is constructed. The outgoing IP packets may be intercepted by, for example, communications monitoring module 120 of FIG. 1. At this stage, both the source and destination addresses are known and therefore may be used in constructing the watermark.

On the server side, the ID field of incoming segments is extracted following the stage in which complete segments are reassembled from incoming packets, but preceding the stage in which the reassembled packet is transmitted to higher-level functions for further processing (which may include operating system and application-level services). Incoming segments may be intercepted by, for example, communications monitoring module 220 of FIG. 2. The watermark may then be validated by, for example, watermark verification module 230, and the segment accordingly approved or discarded according to the teachings of the present invention.

A second exemplary method for watermarking consistent with the present invention involves fragmented watermarking using the TOS field. This watermarking approach exploits the rarely used (currently 8-bit) TOS field in IP headers, conjointly with the fragmentation mechanism, in order to provide at least 32 bits (4 bytes) of watermark per IP segment.

The method works by breaking up the target segment into a number of unambiguously ordered packets, encoding 8 bits of watermark in each of these packets. Any segment with non-empty payload may be broken into some number of unambiguously ordered packets, recognized by unique combinations of payload length, offset, and "next" flag. Exemplary types of packets include: 1) a leading packet with empty payload (hence, having length 0), offset 0, and the "next" flag set; 2) a second packet containing some or all of the actual segment payload (hence, of non-zero length), offset 0, and the "next" flag set; 3) optional packets containing the remainder of the segment payload, having non-zero length, non-zero offset, and the "next" flag set; 4) a penultimate packet with empty payload, hence, having zero length, non-zero offset, and the "next" flag set; and 5) a final packet with empty payload, hence, having zero length, non-zero offset, and the "next" flag reset.

The TOS field method may be combined with the segment ID field method to allow use of a larger number of bits of watermark data per segment. For example, at the current time, the protocol uses 16 bits in the segment ID field and 8 bits in the TOS field, the two methods used together would allow 24 bits (or three bytes) of data per segment to be used in the watermarking process.

Exemplary System Architecture

Figure 5:
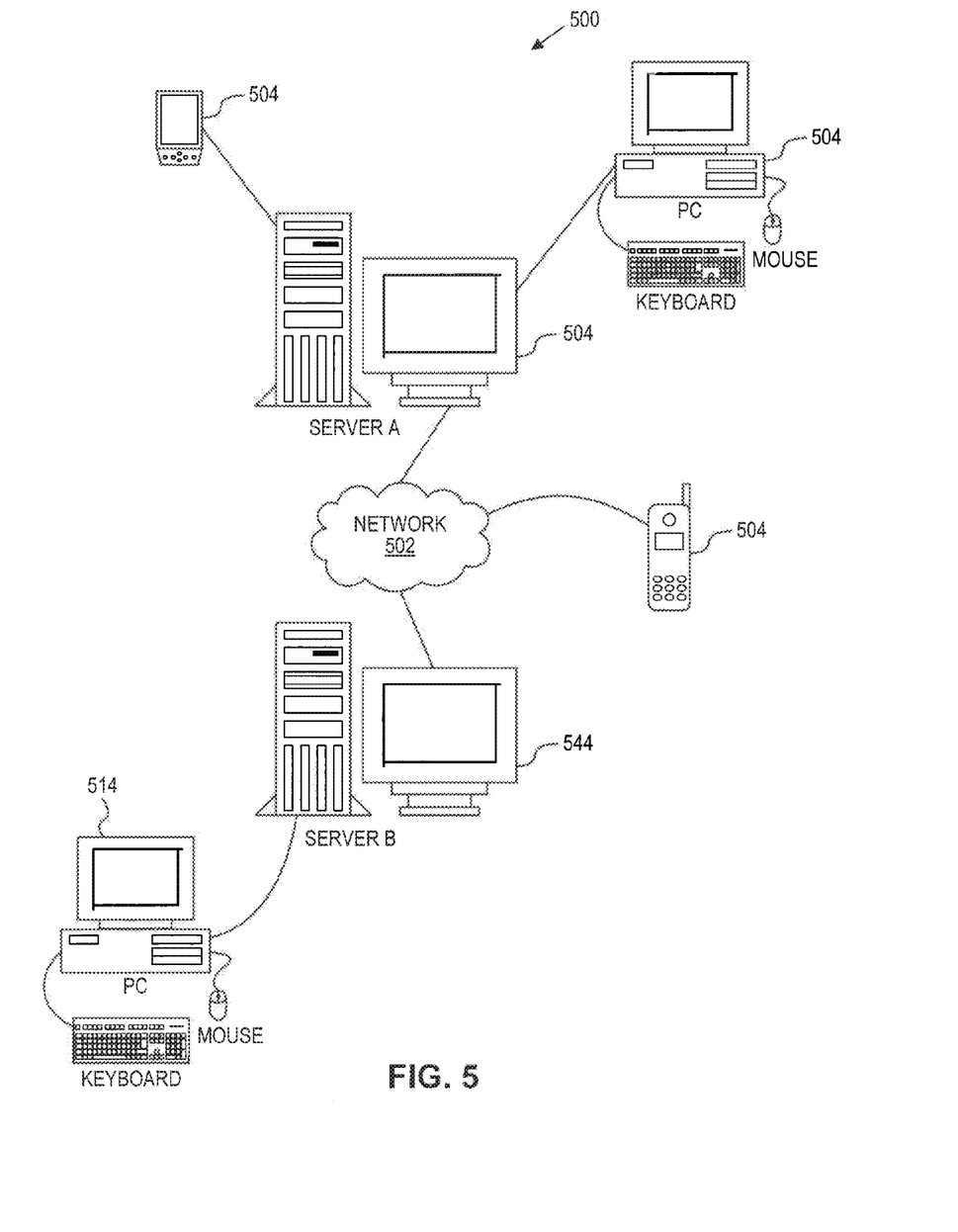
FIG. 5 illustrates one embodiment of a client-server system consistent with the present invention.

FIG. 5 illustrates one embodiment of a system consistent with the present invention. In fact, any conventional computer system may be programmed to support the principles of the present invention. The system in FIG. 5 represents a computer network 500 that comprises one or more client computers 504 and 514 and one or more servers 540 and 544 interconnected via network 502. In this specification, the terms "client" and "server" are used to refer to a computer's general role as a requester of data (client) or provider of data (server), however each computer may request data in one transaction and provide data in another transaction, thus changing the computer's role from client to server. Client 504 may also be a thin client, which is generally understood to be a network computer without a hard disk drive. Client 504 may also be a personal digital assistant ("PDA"), such as a PalmPilot, a cellular phone, or other computerized device. As shown in FIG. 5, client 504 may be connected to one or more servers by a suitable bus or wireless connection.

In some embodiments, a software application operating on client 504 may place a request that involves data stored on or instructions that are executed on Server A 540. Since client 504 is directly connected to Server A 540, for example, through a local area network, this request would not normally result in a transfer of data or instructions over what is shown as "network" of FIG. 5. The "network" of FIG. 5 represents, for example, the Internet, which is an interconnection of networks. A different request may involve data or instructions stored on Server B 544. In this case, the data may be transferred from Server B 544 through the network to Server A 540 and, finally, to computer 502. The distance between Server A 540 and Server B 544 may be very long, e.g. across states, or very short, e.g., a few inches. Further, in traversing the network the data may be transferred through several intermediate servers and many routing devices, such as bridges and routers.

Figure 6:
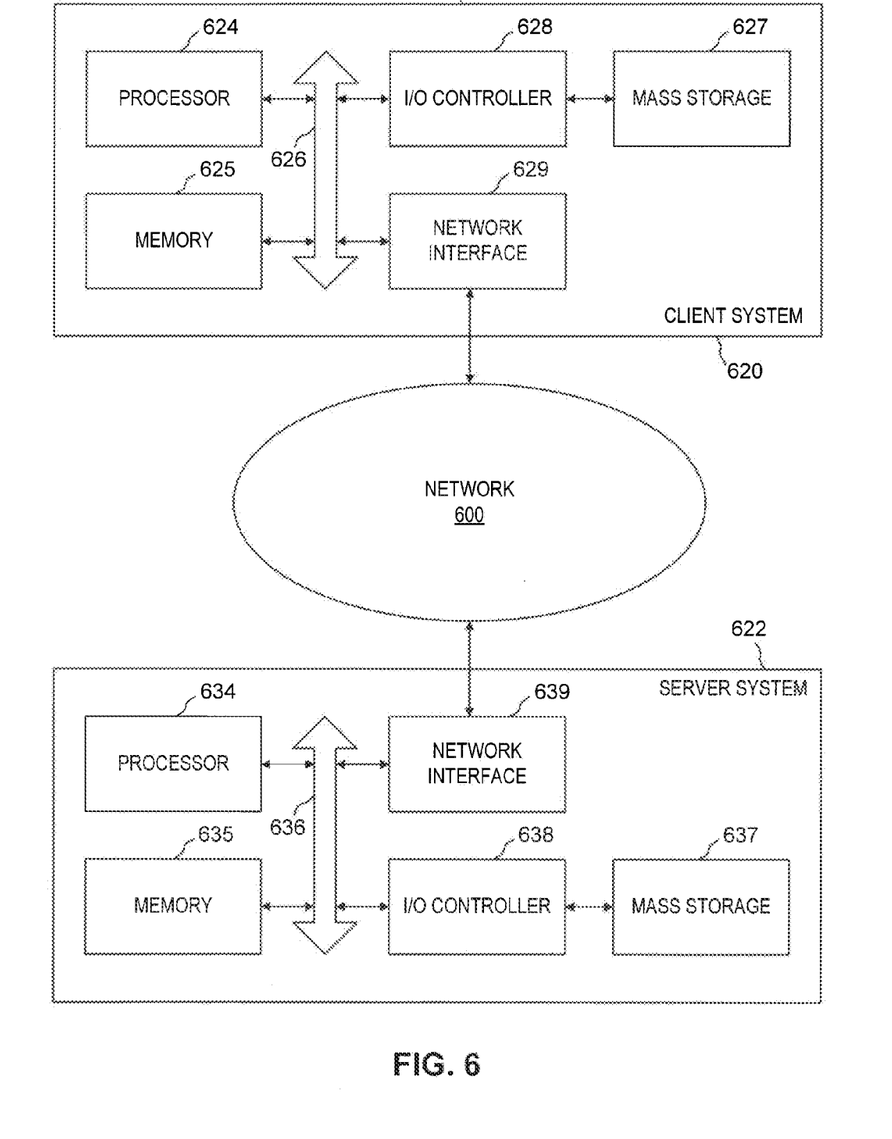
FIG. 6 shows, in more detail, an example of a client-server system interconnected through the network.

FIG. 6 shows, in more detail, an example of a client-server system interconnected through network 600. In this example, a server system 622 is interconnected through network 600 to client system 620. Client system 620 includes conventional components such as a processor 624, memory 625 (e.g. RAM), a bus 626 which couples processor 624 and memory 625, a mass storage device 627 (e.g. a magnetic hard disk or an optical storage disk) coupled to processor 624 and memory 625 through an I/O controller 628 and a network interface 629, such as a conventional modem.

Server system 622 also includes conventional components such as a processor 634, memory 635 (e.g. RAM), a bus 636 which couples processor 634 and memory 635, a mass storage device 637 (e.g. a magnetic or optical disk) coupled to processor 634 and memory 635 through an I/O controller 638 and a network interface 639, such as a conventional modem. It will be appreciated from the description below that the present invention may be implemented in software which is stored as executable instructions on a computer readable medium on the client and server systems, such as mass storage devices 627 and 637 respectively, or in memories 625 and 635 respectively.

Processors 624 and 634 may be microprocessors such as the Pentium® family microprocessors manufactured by Intel Corporation. However, any other suitable microprocessor, micro-, mini-, or mainframe computer, may be used. Memories 625 and 635 may include a random access memory (RAM), a read-only memory (ROM), a video memory, or mass storage. Mass storage 627 and 637 may include both fixed and removable media (e.g., magnetic, optical, or magnetic optical storage systems or other available mass storage technology). Memories 625 and 635 may contain a program, such as an operating system, an application programming interface (API), and other instructions for performing the methods consistent with the invention.

Thus, methods and systems are disclosed for providing secure transactions across a network and, more particularly, for watermarking at the packet level. The present invention may also be embodied as computer-readable media that include program instructions or program code for performing various computer-implemented operations based on the methods of the present invention. The program instructions may be those specially designed and constructed for the purposes of the invention, or they may be of the kind well-known and available to those having skill in the computer software arts. Examples of program instructions include machine code, such as produced by a compiler, and files containing a high level code that can be executed by the computer using, for example, an interpreter or equivalent execution engine to facilitate execution of high level code. Alternative embodiments will become apparent to those skilled in the art to which the present invention pertains without departing from its spirit and scope. Accordingly, the scope of the present invention is defined by the appended claims rather than the foregoing description.

APPENDIX A

```
// File: gbLogicAPI.h
#ifndef __GBLOGICAPI_H
#define __GBLOGICAPI_H
/*
 * Data types
 */
// return status for all GB watermarking logic calls
typedef enum {
    GB_nil,             // unexpected error condition
    GB_ok,              // success condition
    GB_deny,            // incoming segment to be dropped
    GB_prepare,         // client monitor is to perform synch
    GB_reauth,          // serv. mon. to request client resynch
} GB_action_t;
// 16-bit watermark data type
typedef    struct  { char bytes[ 2]; }   GB_watermark_t;
// 256-bit shared secret state agreement data type
typedef    struct  { char bytes[32]; }   GB_agreement_t;
// opaque context for watermarking logic module
typedef    struct GB_context_s   GB_context_t;
/*
 * Housekeeping
 */
// constructor
GB_context_t * gbInitialize( );
// destructor
void gbFinalize ( GB_context_t * ctx);
/*
 * Client calls
 */
// return values: GB_nil, GB_ok
GB_action_t
gbPrepareWMark (     GB_context_t           * ctx,
                     GB_agreement_t         * data,
                     ipaddr_t                 src,
                     ipaddr_t                 dst);
// return values: GB_nil, GB_ok, GB_prepare
GB_action_t
gbWMarkOutgoing (    GB_context_t           * ctx,
                     GB_watermark_t         * mark,
                     ipaddr_t                 src,
                     ipaddr_t                 dst);
/*
 * Server calls
 */
// return values: GB_nil, GB_ok, GB_deny
GB_action_t
gbSynchronizeWMark ( GB_context_t           * ctx,
                     GB_agreement_t const   * data,
                     ipaddr_t                 src,
                     ipaddr_t                 dst);
// return values: GB_nil, GB_ok, GB_deny, GB_reauth
GB_action_t
gbWMarkIncoming (    GB_context_t *           ctx,
                     GB_watermark_t const   * mark,
                     ipaddr_t                 src,
                     ipaddr_t                 dst),
                     void const             * segment_hdr);
#endif /* __GBLOGICAPI_H */
// End of file
```

What is claimed is:

1. A method for providing secure transmission's across a network comprising a client device and a server, the method comprising:

at the client device, generating a stream of watermark bits, wherein generating the stream of watermark bits comprises generating the steam of watermark bits from an authorization and synchronization packet previously exchanged between the client device and the server;

generating a plurality of different watermarks from the stream of watermark bits, each of the plurality of different watermarks comprising a respective index number and a respective portion of the stream of watermark bits, wherein each of the plurality of different watermarks comprises a different respective index number;

inserting the plurality of different watermarks into respective headers of a plurality of outgoing packets of a packet stream;

receiving, at the server, the plurality of outgoing packets; and determining if a received packet is valid based on the watermark in the header of the received packet.

2. The method of claim 1, further comprising activating a session by exchanging the authorization and synchronization packet between the client device and the server.

3. The method of claim 1, further comprising:

discarding the received packet, if the watermark in the header of the received packet is not valid.

4. The method of claim 1, wherein determining if a received packet is valid comprises:
comparing the watermark in the header of the received packet to first and second windows, each of the first and second windows comprising a set of expected watermarks; and
accepting the watermark as valid if the watermark matches one of the expected watermarks in the first or second window.

5. The method of claim 4, wherein the set of expected watermarks are generated from the authorization and synchronization packet previously exchanged between the client device and the server.

6. The method of claim 4, comprising:
discarding the packet, if the watermark in the header of the received packet does not match any of the expected watermarks in the first or second window.

7. The method of claim 4, wherein comparing the watermark further comprises:
maintaining at the server a record of a pivotal index number representing the index number of the highest-numbered valid watermark received from the client device,
wherein the first window includes expected watermarks whose index numbers precede the pivotal index number and the second window includes expected watermarks whose index numbers immediately supersede the pivotal index number.

8. The method of claim 7, comprising:
increasing the pivotal index number if a match is found in the second window and deleting the matching expected watermark from the second window.

9. The method of claim 1, wherein the stream of watermark hits is generated by a stream cipher.

10. The method of claim 1, wherein inserting the plurality of watermarks includes determining whether a valid session exists and inserting the plurality of watermarks only if the valid session exists.

11. The method of claim 1, wherein each of the plurality of different watermarks comprises a different respective portion of the stream of watermark bits.

12. A system for providing; secure transmissions across a network, the system comprising:
a client device for
generating a stream of watermark bits, wherein generating the stream of watermark bits comprises generating the steam of watermark bits from an authorization and synchronization packet previously exchanged between the client device and the server;
generating a plurality of different watermarks from the stream of watermark bits, each of the plurality of different watermarks comprising a respective index number and a respective portion of the stream of watermark bits, wherein each of the plurality of different watermarks comprises a different respective index number;
inserting the plurality of different watermarks into respective headers of a plurality of outgoing packets of a packet stream; and
transmitting the outgoing packets to a server; and
a server for
receiving the plurality of outgoing packets; and
determining if a received packet is valid based on the watermark in the header of the received packet.

13. The system of claim 12, wherein inserting the plurality of watermarks includes determining whether a valid session exists and inserting the plurality of watermarks only if the valid session exists.

14. The system of claim 12, wherein the server further discards the packet, if the watermark in the header of the received packet is not valid.

15. The system of claim 12, wherein the server determines if the received packet is valid by comparing the watermark in the header of the received packet to first and second windows, each of the first and second windows comprising a set of expected watermarks; and
accepting the watermark as valid if the watermark matches one of the expected watermarks in the first or second window.

16. The system of claim 15, wherein the server discards the packet, if the watermark in the header of the received packet does not match any expected watermarks in the first or second window.

17. The system of claim 15, wherein comparing the watermark further comprises:
maintaining at the server a record of a pivotal index number representing the index number of the highest-numbered valid watermark received from the client device,
wherein the first window includes expected watermarks whose index numbers precede the pivotal index number and the second window includes expected watermarks whose index numbers immediately supersede the pivotal index number.

18. The system of claim 17, wherein the server increases the pivotal index number if a match is found in the second window and deletes the matching expected watermark from the second window.

19. The system of claim 12, wherein the stream of watermark hits is generated by a stream cipher.

20. The system of claim 12, wherein each of the plurality of different watermarks comprises a different respective portion of the stream of watermark hits.

* * * * *

UNITED STATES PATENT AND TRADEMARK OFFICE
CERTIFICATE OF CORRECTION

PATENT NO. : 8,522,034 B2  
APPLICATION NO. : 13/213943  
DATED : August 27, 2013  
INVENTOR(S) : Erlingsson et al.

Page 1 of 1

It is certified that error appears in the above-identified patent and that said Letters Patent is hereby corrected as shown below:

In the Claims

Column 13
Claim 1, Line 54, please replace "transmission's" with --transmissions--.

Signed and Sealed this  
Thirty-first Day of December, 2013

Margaret A. Focarino  
*Commissioner for Patents of the United States Patent and Trademark Office*